United States Patent [19]

Holden et al.

[11] 3,988,409

[45] Oct. 26, 1976

[54] METHOD OF SEVERING A FLEXIBLE REINFORCED ELASTOMERIC CONDUIT SUPPORTED ON A PLURALITY OF ELONGATED END-TO-END RIGID MANDRELS

[75] Inventors: Homer N. Holden, Sylva; James P. Hunt, Clyde; Vernon D. Browning, Waynesville; Edward L. Hoglen, Candler, all of N.C.; Donald L. Kleykamp, Springboro, Ohio

[73] Assignee: Dayco Corporation, Dayton, Ohio

[22] Filed: Feb. 23, 1976

[21] Appl. No.: 660,751

Related U.S. Application Data

[62] Division of Ser. No. 555,492, March 5, 1975, Pat. No. 3,966,104.

[52] U.S. Cl. .............................. 264/159; 29/527.2; 83/27; 264/163; 264/173; 264/174; 264/322

[51] Int. Cl.$^2$ .................... B29C 17/14; B29D 23/05

[58] Field of Search .......... 264/150, 159, 163, 209, 264/210, 173, 174, 271, 334, 322; 29/527.2; 83/27

[56] References Cited

UNITED STATES PATENTS

| | | | |
|---|---|---|---|
| 2,338,210 | 1/1944 | Snyder | 264/159 |
| 2,561,569 | 7/1951 | Flynn | 264/163 |
| 2,599,493 | 6/1952 | Slaughter | 264/150 |
| 3,249,663 | 5/1966 | French | 264/173 |
| 3,399,262 | 8/1968 | Quackenbush et al. | 264/210 R |
| 3,474,162 | 10/1969 | Seckel | 264/150 |

*Primary Examiner*—Willard E. Hoag
*Attorney, Agent, or Firm*—Reuben Wolk

[57] ABSTRACT

Method of severing a flexible reinforced elastomeric conduit supported on a plurality of elongated rigid mandrels is provided so that each mandrel has a length of conduit therearound which is approximately equal to the length of the mandrel.

7 Claims, 5 Drawing Figures

METHOD OF SEVERING A FLEXIBLE REINFORCED ELASTOMERIC CONDUIT SUPPORTED ON A PLURALITY OF ELONGATED END-TO-END RIGID MANDRELS

CROSS REFERENCE TO RELATED APPLICATIONS

This is a division of Ser. No. 555,492, filed Mar. 5, 1975, and now U.S. Pat. No. 3,966,104.

This application is related to applicants' copending applications, Ser. No. 555,493, filed Mar. 5, 1975, now U.S. Pat. No. 3,939,957, issued Dec. 30, 1975 and Ser. No. 555,491, filed Mar. 5, 1975, now U.S. Pat. No. 3,946,483, issued Mar. 30, 1976, filed on the same date as the present application.

BACKGROUND OF THE INVENTION

Flexible tubular conduits made primarily of elastomeric materials are in wide use throughout industry whereby numerous manufacturers are engaged in making and selling such conduits, resulting in a highly competitive industry.

It has been found that tubular conduits of this type are often used for vacuum cleaner hoses or conduits and a typical vacuum cleaner conduit has one or more reinforcing wires wound in a helical pattern along the length of the conduit and an elastomeric sleeve usually made of a plastic material is provided around the reinforcing wire or wires.

It is generally very difficult if not impossible to produce a high quality vacuum cleaner conduit (i.e., one with precisely controlled wall thickness and diameter) of the character mentioned without producing such a conduit on a rigid non-collapsible mandrel of substantial length, such as of at least several feet and preferably of the order of 50 feet and even more. However, in manufacturing such a conduit on a rigid mandrel of such a substantial length, it is ordinarily very difficult to remove the mandrel from within the flexible tubular conduit in a simple and efficient manner without damage to the conduit and its supporting mandrel.

It has been found that such a conduit may be more easily removed from a rigid non-collapsible mandrel of the character mentioned by first severing the conduit so that a length thereof is provided on an associated mandrel and with the conduit having a length approximately equal to the length of its rigid supporting mandrel.

SUMMARY

This invention provides a simple and efficient apparatus for and method of severing a flexible reinforced elastomeric conduit which is supported on a plurality of elongated rigid non-collapsible mandrels so that each mandrel has a length of conduit therearound which is approximately equal to the length of the mandrel. The severing apparatus and method of this invention employ means for weakening the conduit adjacent associated ends of each pair of associated mandrels and means for pulling the weakened conduit apart at each location in a manner heretofore unknown.

In those instances where the flexible conduit has at least one helical reinforcing wire extending therealong, the improved apparatus and method of this invention provides means for cutting such helical reinforcing wire adjacent each of the said locations to enable the conduit to be pulled apart in an axial direction.

Other details, uses, and advantages of this invention will be readily apparent from the exemplary embodiments thereof presented in the following specification, claims, and drawings.

BRIEF DESCRIPTION OF THE DRAWING

The accompanying drawing shows present exemplary embodiments of this invention, in which.

DETAILED DESCRIPTION

Figure 1:
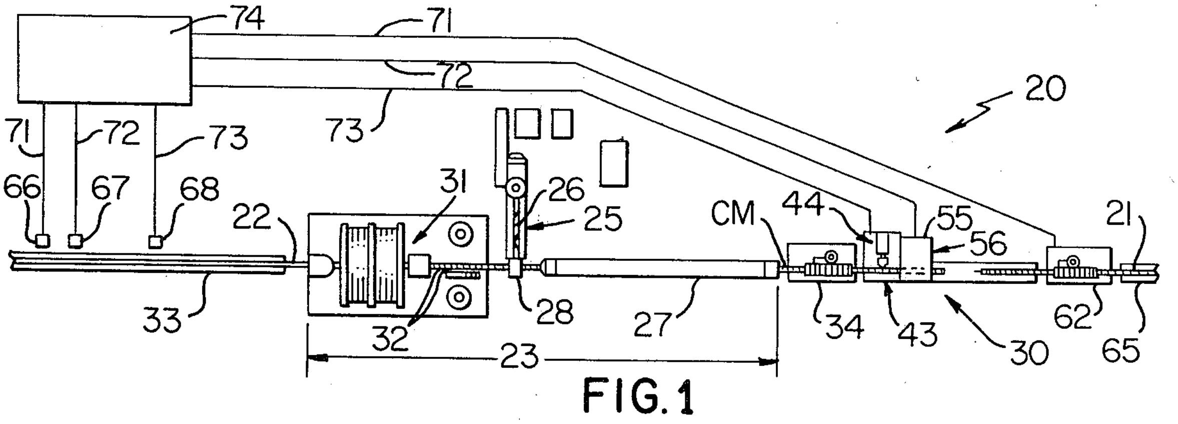
FIG. 1 is a plan view with parts broken away and other parts shown schematically of a portion of an exemplary machine system or apparatus which may be employed to produce a continuous reinforced elastomeric conduit and such system utilizes one exemplary embodiment of the improved apparatus and method of this invention for severing such conduit.

Reference is now made to FIG. 1 of the drawing which illustrates a fragmentary portion of an exemplary apparatus or machine system which is designated generally by the reference numeral 20 and the machine system or machine 20 may be of the type disclosed in applicants' cross-referenced U.S. Pat. No. 3,939,957 and is particularly adapted to produce a flexible reinforced elastomeric conduit 21 in a continuous manner. The machine 20 employs a plurality of elongated substantially rigid non-collapsible mandrels 22 which are operatively associated in aligned end-to-end relation in a manner to be described in more detail subsequently.

Figure 4:
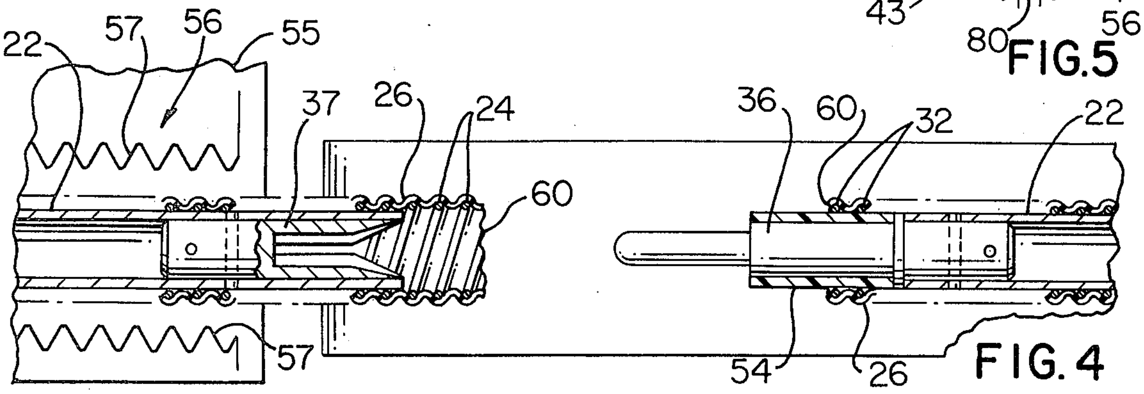
FIG. 4 is an enlarged fragmentary plan view with parts in cross section, parts broken away, and parts shown schematically particularly illustrating the conduit immediately after it has been pulled apart.

The mandrels 22 of this example are operatively associated by interconnection thereof as will be described subsequently and are moved continuously through a fabrication area which is designated generally by the reference numeral 23 where at least one elongated plastic sleeve covered reinforcing member or wire, and in this example a plurality of two reinforcing wires 24, see FIG. 4, are formed around the mandrels in a pair of continuous non-rotating helical coils 32. An extruder head 28 which is provided as a part of an extrusion apparatus 25 is located in the fabrication area 23 and extrudes a plastic tube 26 around the coils 32 and the tube 26 is urged and bonded thereagainst to define a conduit covered mandrel, designated CM. The extrusion apparatus 23 has suitable urging means associated with the extruder head 28 for urging the hot plastic tube 26 against the coils 32; and, such urging means comprises vacuum means associated with extruder head 28 and may be of the type disclosed in U.S. Pat. No. 3,725,178, and the disclosure of this patent is incorporated herein by reference.

The apparatus or machine 20 also has cooling means such as a cooling apparatus or chamber 27 which cools the hot plastic tube 26 which has been heat fused at its points of contact with the plastic sleeve of the wires 24.

The conduit 21 is separated from around the operatively associated mandrels 22 and such separation is achieved by severing the conduit 21 utilizing the apparatus and method of this invention, which is designated generally by the reference numeral 30, so that each mandrel 22 has a length of conduit 21 therearound which is approximately equal to the length of its supporting mandrel. The conduit length 21 is removed from around its associated mandrel 22 utilizing the removing apparatus and method disclosed in the above cross-referenced U.S. Pat. No. 3,946,483.

The conduit 21 of this example is particularly adapted for use as a vacuum cleaner conduit or hose and comprises the two helically wound reinforcing wires 24 each of which is also capable of serving as an electrical conductor and for reasons which are well known in the vacuum cleaner industry. Each wire 24 has a central electrically conductive core made of a metallic material and an outer wire sleeve made of a plastic material in the form of an electrical insulating material. Each wire sleeve is made of a material which is compatible with the plastic tube 26 so that once such tube is urged and formed against the sleeves of wires 24 a unitary conduit 21 is defined.

The machine 20 has suitable wire forming means in the form of a wire forming or coiling machine which is designated generally by the reference numeral 31 whereby a pair of wires 24 are formed into a pair of continuous helical coils 32 extending the full length of the conduit 21 and thus each length thereof. The coils 32 are actually formed by the machine 31 against the mandrel 22 enabling forming thereof in a precise manner.

The extrusion apparatus 25 and its extruder head 28 are provided in the fabrication area 23 downstream of the wire-forming machine 31, see FIG. 1. The extruder head 28 has suitable means therein for receiving an elastomeric material preferably in the form of a plastic material which is designated by the same reference numeral 26 as the plastic tube comprising the conduit 21 and such plastic material 26 is received in a flowable condition and extruded in tubular form around the coils 32 and an associated mandrel 22.

The machine system 20 has conveying means through the fabrication area 23 comprising a conveyor 33 and a puller 34 and such conveyor and puller are particularly adapted to move each mandrel 22 with helical coils 32 therearound through the extruder head 24 at a speed correlated with the speed of forming the helical coils 32. The helically wound coils 32 with the plastic tube 26 extruded thereagainst are bonded together by fusion between the hot semi-molten inside surface of the tube 26 as it engages the outside surface of the plastic sleeve of the reinforcing wires 24.

As previously mentioned the machine 20 has suitable cooling means in the form of the cooling apparatus or chamber 27 which cools the hot plastic tube 26 extruded against coils 32. The cooling apparatus 27 may be of any suitable type commonly used in the art and preferably is in the form of a either a trough filled with circulating cold tap water or a chamber having spray nozzles therein each of which directs a spray of water against the hot plastic tube as it exits the extruder head 28 of apparatus 25.

Figure 2:
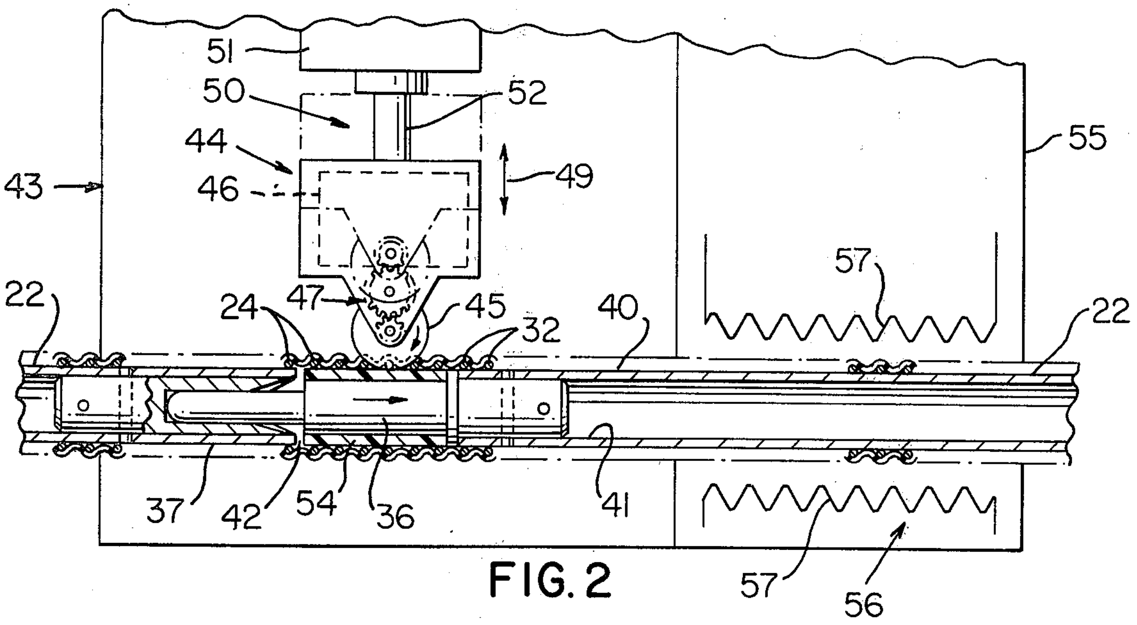
FIG. 2 is a view with parts in elevation, parts in cross section, and parts shown schematically particularly illustrating a cutting device utilized to cut reinforcing wires of the flexible reinforced elastomeric conduit and associated conduit weakening means in the form of an electrical heater arranged downstream of the wire cutting device.

As will be readily apparent from FIGS. 2 and 4 of the drawing, the mandrels 22, which may also be considered as mandrel means, have means for connecting associated ends thereof in aligned relation and such connecting means comprises a male connector 36 and a female connector 37 at opposite ends of each mandrel 22 with the male connector 36 of one mandrel 22 being adapted to be connected to the female connector 37 of an adjoining mandrel 22. The associated male and female connectors 36 and 37 are brought together during operation of the machine 20 and fit together with a loose fit therebetween; however, the associated male and female connectors are held together by the precise control of the movement of each set of forward and rear mandrels during the forming of coils 32 therearound and the extrusion of tube 26 over the coils and mandrel.

Each of the mandrels 22 is a substantially rigid noncollapsible mandrel and is made of a comparatively hard nonyielding material such as metal, a hard plastic, or the like, and in this example each mandrel 22 is preferably in the form of a tubular mandrel which has a substantially rigid right circular cylindrical outside surface 40 and a similar right circular cylindrical inside surface 41. As best seen in FIG. 2 of the drawing, the connectors 36 and 37 connect associated mandrels 22 so that their cylindrical outside surfaces 40 are arranged in aligned relation and in essence define one substantially continuous cylindrical surface as the mandrels pass through the fabrication area 23 with the exception that a small annular gap 42 may be provided between a connected male connector 36 and female connector 37 to prevent damage to adjoining cylindrical surfaces. Because of their loose fit each pair of connected connectors 36 and 37 are easily pulled apart once the conduit 21 of the conduit covered mandrel CM is severed and the severing apparatus and method will now be described in detail.

The severing apparatus and method 30 of this invention enable severing of the conduit 21 in a simple and efficient manner. The apparatus 30 comprises a cutting station 43 downstream of area 23 which has a cutting device or cutter 44 for cutting the plurality of two helical coils 32 of the wires 24. The cutter 44 may be of any suitable type but in this example comprises a rotary cutting blade or abrasive cutoff wheel 45 driven by an electric motor 46 through a suitable gear train 47. The cutter 44 also has means or a device designated generally by the reference numeral 50 for moving the rotary knife or abrasive wheel 45 toward and away from the conduit 21 and such means enables movement in the direction of the double arrow 49 illustrated in FIG. 2 and includes an actuator 51 of known construction which has an extensible and retractible rod 52 extending from the lower end thereof.

The cutting wheel 45 is moved or extended by device 50 into cutting engagement with one of the coils 32 so that it cuts such coils and is maintained in its extended position during movement of the conduit covered mandrel CM therepast so that the second coil 32 of the plurality of two coils is also cut whereupon the cutting wheel 45 is retracted and with this type of movement it will be appreciated that the cutting wheel 45 need not move in an axial direction with the conduit covered mandrel CM. The cutting wheel 45 is maintained in its extended or cutting position for a predetermined time increment which is preset on a suitable switch mechanism of known construction and such time is correlated with the speed of movement of the conduit covered mandrel CM through the cutting station 43.

The cutting wheel 45 is moved into cutting engagement once an associated connector, preferably a male connector 36, moves into the cutting station 43 opposite the cutting wheel 45. To assure an efficient cutting action, the male connector 36 serves as backup anvil during the cutting operation and preferably has a resilient elastomeric sleeve 54 therearound which is engaged by the cutting wheel 45 to assure that such wheel is not dulled prematurely.

It will also be appreciated that instead of providing the cutting device 44 having a single rotary wheel or knife 45 the device 44 may have a plurality of cooperating cutters corresponding in number to the number of helical coils 32 to be cut. The knife 45 may also be of the nonrotatable variety and be such that it is forced by moving device 50 against wires 24 of the plurality of two coils 32 to be cut and thereby cut the two coils in a single thrust of such a cutting blade.

Figure 3:
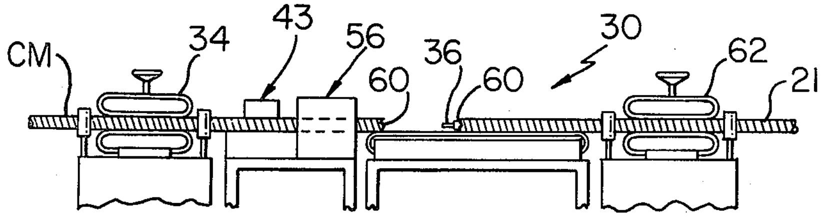
FIG. 3 is a fragmentary view in elevation particularly illustrating means for pulling the weakened conduit apart at each weakened location.

The apparatus 30 also comprises weakening means 55 shown in FIG. 2 in the form of a heater 55 at a weakening station which is designated generally by the reference numeral 56 and station 56 is arranged downstream of the fabrication area 23. For simplicity the heater 55 is shown having a plurality of electrical heating elements 57 which are shown as resistance elements; however, in one machine 20 an infrared heater and associated controls have been used successfully. The heater 55 is particularly adapted to provide substantially instantaneous heating around the entire outer circumference of the conduit 21; and in this example the elastomeric material of the elastomeric plastic tube 26 to a temperature approaching the plastic flow temperature of such elastomeric material. This heating to such temperature approaching the plastic flow temperature provides a substantial weakening and enables moving means of the apparatus 30 to literally pull the tube 26 apart and because the two coils 32 have been previously cut, severed ends are defined as illustrated at 60 in FIGS. 3 and 4. It will be appreciated that the cutting provided by the cutting wheel 45 and the weakening provided by the heater 55 are both provided at substantially the same location adjacent associated ends of each pair of associated mandrels and in particular adjacent the connected male and female connectors 36 and 37 respectively of each associated pair of connected mandrels 22.

The apparatus 30 also includes means for pulling the heat-weakened plastic material apart at the heated area in a manner now to be described and such means comprises moving means which will be identified as first moving means for moving each conduit covered mandrel CM at a particular speed as it exits the fabrication area 23 of the machine system 20. In particular, the first moving means comprises the previously mentioned puller 34 which assures that each mandrel 22 is moved through the wire forming or winding machine 31, extruder head 28 of the extrusion apparatus 25, and the cooling chamber 27 at a predetermined particular speed allowing the conduit 21 to be continuously formed along the interconnected mandrels 22 each of which is over several feet in length and each is preferably about 50 feet long.

The apparatus 30 also has second moving means which is in the form of a second puller which is designated generally by the reference numeral 62 and the second puller 62 is arranged downstream of the weakening means and in particular downstream of the heater 55 and is provided for moving the forward one of each associated pair of mandrels 22 as it exits the weakening station 56, and in particular as it exits the heater 55, at a speed faster than the speed at which the puller 34 is moving each mandrel 22 through the fabrication area 23. It should be understood that ordinarily the pullers 34 and 62 move the conduit covered mandrel CM at the same set speed. However, the puller 62 is a two speed puller capable of operating faster than puller 34. Once the conduit 21 is weakened around a male connector 36 by the action of the heater 55 and with the coils 32 having been previously cut by the cutting knife 45 over an associated male connector 36, the movement of the puller 62 is automatically increased, in a manner to be described subsequently, causing the conduit 21 to be literally pulled or severed apart at its weakened location adjacent the cut coils 32 whereby the forward mandrel with conduit 21 therearound is moved rapidly away from the weakening station 56.

The above-described operation is repeated as each male connector 36 proceeds through the stations 43 and 56 resulting in each mandrel 22 having a covering of conduit 21 therearound roughly corresponding to its length. The conduit covered mandrel is then moved onto a belt conveyor 65 and such mandrel will also be referred to as a conduit covered mandrel or simply as a covered mandrel CM. The conveyor 65 continues movement of the conduit covered mandrel CM through the machine system 20 to the mandrel removing apparatus disclosed in the above referenced U.S. Pat. No. 3,946,483 or any suitable apparatus provided for the same purpose of removing each mandrel 22 from within its conduit 21 supported therearound.

Each mandrel 22 is then transferred by the machine system 20 to a suitable combination storage and dispensing apparatus whereupon each mandrel 22 is then serially introduced into the system 20 for subsequent reuse in the continuous manufacture of conduit 21. Each stripped conduit 21 that has been removed from around a particular mandrel 22 is then further processed for use in a suitable end application.

Having described the various components of apparatus and method 30, the description will now proceed with an overall description of the manner in which flexible reinforced tubular conduit 21 particularly adapted for use as a vacuum cleaner hose may be formed using the plurality of operatively associated end-to-end rigid mandrels of substantial length and the manner in which the conduit 21 is severed so that each mandrel 22 has a length of conduit 21 therearound approximately equal to the length of the mandrel. Each mandrel 22 is serially dispensed and suitably interconnected with a previously dispensed mandrel 22 so that each mandrel 22 is moved onto conveyor 33 which in turn moves the mandrel 22 into the fabrication area 23.

In the fabrication area 23 the wire forming or coiling machine 31 wraps or coils two wires 24 each into a helical coil 32 around each mandrel 22 and the coiling of the two wires 24 is achieved in a simultaneous manner. As explained earlier, the wires 24 have outer sleeves made of elastomeric, plastic in this example, material.

Each mandrel 22 is then passed through the extruder head 28 of the extrusion apparatus 25 which extrudes a plastic tubular sleeve or tube 26 concentrically around and against the helical coils 32 of the wires 24 to define the conduit 21. The mandrel with its tube 26 and coils 32 is then continued through the cooling chamber 27 to cool the conduit 21.

The mandrels 22 are preferably fed through the fabrication area 23 with the female connector 37 thereof being at the front end of the moving mandrel. Each mandrel 22 is serially dispensed so that the female connector 37 of a newly dispensed mandrel is interconnected with the trailing male connector 36 of the mandrel 22 just passing through the fabrication area 23 to assure a continuous uninterrupted flow of mandrels through such fabrication area 23.

As each mandrel 22 with conduit 21 thereon moves out of the fabrication area 23, the male connector 36 at the trailing end of a trailing interconnected mandrel 22 energizes a series of electrical switches 66, 67, and 68 which are connected by suitable electrical lines 71, 72, and 73 through a control console 74 to the cutter 44, heater 55, and puller 62 respectively. It will be appreciated that the mandrels 22 are of substantially equal length and that the switches 66, 67, and 68 are positioned to correlate with the positions of components 44, 55, and 62 so that signals from the male connector 36 of the trailing mandrel may be effectively and efficiently used to control operation of the various devices on the male connector of the forward mandrel 22.

The signal from the switch 66 signals the cutter 44 to cut the coils 32 in the manner previously mentioned, the signal from the switch 67 signals the heater 55 causing heating elements of such heater to heat the tube 26 adjoining and immediately adjacent the cut coils 32 to provide partial melting or at least heating thereof to a semiplastic condition. As the forward mandrel 22 with its trailing male connector 36 continues to be moved by the puller 34 at a predetermined set speed, which at this point is the same speed as puller 62, the signal from the switch 68 signals the puller 62 causing such puller to speed up its movement for a predetermined time increment determined by suitable control means in the puller 62 whereby the increased speed of the leading mandrel 22 causes the male connector 36 to be pulled away from the female connector 37 of the comparatively slower moving trailing mandrel 22 and causing the plastic tube 26 to be literally pulled apart or severed in the heated area near the cut coils so it has the appearance as shown at 60 in FIGS. 3 and 4. The switches 66, 67, and 68 may be of any suitable type and preferably such switches are such that they sense the material used in making each male connector 36 as the connector 36 moves therepast causing the signal to be supplied through the controller 74 to an associated apparatus, either cutter 44, heater 55, or puller 62.

It will be appreciated that this procedure is repeated as each male connector 36 moves past the switches 66, 67, and 68 whereby the conduit 21 is severed so that each mandrel 22 has a length of conduit 21 therearound which is equal substantially to its length.

In this disclosure of the invention, the detailed description has proceeded with provision of the apparatus 30 with weakening means 55 in the form of an electrical heater 55; however, it will be appreciated that the electrical heater may be of any suitable type, such as, one or more so-called hot air guns.

Figure 5:
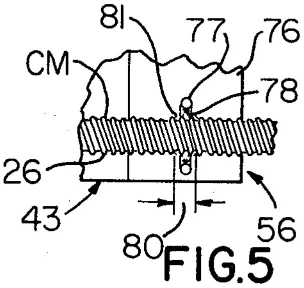
FIG. 5 is a fragmentary view particularly illustrating another exemplary embodiment of weakening means.

It will also be appreciated that weakening means 55 may comprise other suitable means as illustrated in FIG. 5 of the drawings wherein the weakening means 55 at weakening station 56 may utilize a structure 76 which includes an annular ring 77 provided with a plurality of orifices 78 which are inwardly directed toward a conduit covered mandrel CM passing therethrough. Thus, as the conduit covered mandrel CM exits the cutting device at the cutting station 43, an annular portion 80 thereof is sprayed with a suitable chemical material 81 which serves as a solvent and appreciably weakens the plastic tube 26 whereby the conduit 21 may be pulled or severed (after cutting wires 24 in cutter 44) by the cooperating action of the pullers 34 and 62. It will be appreciated that any suitable chemical may be sprayed against the conduit or plastic tube 26 which will provide the desired weakening effect and although a particular material has not been disclosed, such material will be determined by the elastomeric material used to make the tube 26.

The apparatus and method of this invention is fully applicable to mandrels ranging from about 2 feet to 100 feet in length and is also fully applicable to flexible conduits 21 which do not have helically wound reinforcing wires or members.

If desired, each mandrel 22 may have its outside surface suitably coated or treated with an anti-friction material which serves as a slipping agent and allows the mandrels 22 to be more readily slid from within its conduit 21.

In this disclosure of the invention it will be appreciated that various electrical devices, switches, controls, and the like, normally used for controlling the various components which have been described herein have not been illustrated and, the usual control consoles, sources of power, electrical connections, and the like have not been illustrated either. However, it is to be understood that these items as well as all required devices and components used therewith would be provided in accordance with techniques which are well known in the art.

In this disclosure of the invention it will be seen that a reinforced flexible tubular conduit 21 is shown and described as being made primarily of synthetic plastic materials. However, it will be appreciated that the conduit 21 and in particular the tube portion 26 thereof may be made of any suitable elastomeric material in the form of either a plastic material, or a rubber compound whether in the form of a natural rubber compound or a synthetic rubber compound.

It will also be appreciated that the flexible conduit 21 may have only one or a plurality of more than two reinforcing wires or members 24 which are helically wound and provided with or without a sleeve therearound. Further, the flexible conduit 21 may be reinforced by any other suitable means well known in the art.

Reference has been made in this disclosure to the use of pulling devices or pullers 34 and 62 for pulling or moving each conduit covered mandrel CM. These pullers may be of any suitable known construction and in this example of the invention each of such pullers has a pair of cooperating beltlike structures which are urged against and engage opposed surfaces of the conduit covered mandrel CM. The belt-like structures rotate in opposite directions and cooperate once frictionally urged against the conduit covered mandrel CM to pull or move the conduit covered mandrel CM in the manner previously described. A typical puller of this type is manufactured by the Gatto Machinery Development Corporation, 134 Rome Street, Farmingdale, New York 11735 and sold under the designation of Model No. 207 CAT-A-PULLER.

The mandrel 22 is shown herein as being in the form of a tubular mandrel; however, it will be appreciated that such a mandrel need not necessarily be tubular but may be of a substantially solid cross-sectional configuration provided such a solid mandrel is also rigid and has a comparatively rigid outside surface.

The apparatus and method of this invention have been described in connection with the removal of mandrels which are 50 feet long from within conduits 21 used in vacuum cleaner applications. However, it will be appreciated that the apparatus and method of this invention may be utilized to remove all types of substantially flexible conduits from around their associated elongated ridged supporting mandrels including conduits used as automobile ratiator hoses as well as hoses used to convey all types of fluid.

Reference has been made in this disclosure to the forward or leading mandrel, the rear or trailing mandrel, etc. However, it is to be understood that these words have been used to describe the movement of mandrels 22 as they move through the system 20 and the apparatus 30.

Reference has been made in this disclosure to an elastomeric conduit and it should be understood that this refers to the fact that the conduit 21 or similar conduit discussed herein is made mainly of one or more elastomeric materials.

While present exemplary embodiments of this invention and methods of practicing the same, have been illustrated and described, it will be recognized that this invention may be otherwise variously embodied and practiced within the scope of the following claims.

What is claimed is:

1. In a method of producing a continuous flexible reinforced elastomeric conduit which employs a plurality of elongated rigid mandrels interconnected in aligned end-to-end relation for supporting said conduit during continuous production thereof the improvement comprising an improved method of severing said conduit adjacent a joint between adjacent mandrels said method comprising the steps of, weakening said conduit with weakening means at a location adjacent each joint, disconnecting said mandrels and pulling the weakened conduit apart at each of said locations with pulling means so that each mandrel has a length of conduit therearound which is approximately equal to the length of the mandrel.

2. In a method as set forth in claim 1 the further improvement wherein said pulling step comprises pulling said conduit substantially axially.

3. In a method as set forth in claim 2 the further improvement wherein said weakening step comprises weakening said conduit by heating it at each of said locations to a temperature approaching the plastic flow temperature of the elastomeric material used to make said conduit.

4. In a method of producing a continuous flexible elastomeric conduit which is reinforced by a plurality of axially extending helical wires and which employs a plurality of elongated rigid mandrels interconnected in aligned end-to-end relation for supporting said conduit adjacent associated ends of each pair of associated mandrels, said method comprising the steps of, moving each conduit covered mandrel using first moving means at a particular speed as it exits a fabrication area, weakening said conduit with weakening means at a location adjacent a joint between a pair of associated mandrels, said weakening means being at a weakening station downstream of said fabrication area, and moving the forward one of said pair of mandrels as it exits said weakening station using second moving means at a speed faster than said particular speed, disconnecting said mandrels and causing said conduit to be severed apart at said location and causing said forward mandrel with a length of conduit therearound to be moved rapidly from said weakening station.

5. In a method as set forth in claim 4 the further improvement wherein said method comprises cutting each of said plurality of wires adjacent said location with a cutting knife.

6. In a method as set forth in claim 5 the further improvement wherein said weakening step comprises heating said conduit at said location with a heater, said heater heating said conduit at said location to a temperature approaching the plastic flow temperature of the elastomeric material used to make said conduit.

7. In a method as set forth in claim 6 the further improvement wherein said steps of moving said conduit covered mandrel with first and second moving means comprises using a pair of belt-type pullers.

* * * * *